(12) United States Patent
Reknes

(10) Patent No.: US 8,277,557 B2
(45) Date of Patent: Oct. 2, 2012

(54) AGGLOMERATED PARTICULATE LIGNOSULFONATE

(75) Inventor: Kåre Reknes, Sarpsborg (NO)

(73) Assignee: Borregaard Industries Limited, Sarpsborg (NO)

( * ) Notice: Subject to any disclaimer, the term of this patent is extended or adjusted under 35 U.S.C. 154(b) by 260 days.

(21) Appl. No.: 12/538,015

(22) Filed: Aug. 7, 2009

(65) Prior Publication Data
US 2011/0030587 A1  Feb. 10, 2011

(51) Int. Cl.
*A01N 25/00* (2006.01)
*B32B 5/16* (2006.01)
*B32B 9/00* (2006.01)
*B32B 15/02* (2006.01)
*B32B 17/02* (2006.01)
*B32B 19/00* (2006.01)
*B32B 21/02* (2006.01)
*B32B 23/02* (2006.01)
*B32B 27/02* (2006.01)
*C04B 14/00* (2006.01)
*C04B 24/00* (2006.01)
*C04B 16/02* (2006.01)

(52) U.S. Cl. ........ 106/726; 106/731; 106/805; 428/402; 71/64.05

(58) Field of Classification Search .............. None
See application file for complete search history.

(56) References Cited

U.S. PATENT DOCUMENTS

| | | | |
|---|---|---|---|
| 2,582,459 A | 1/1952 | Salathiel | |
| 3,375,873 A | 4/1968 | Mitchell | |
| 3,476,740 A | 11/1969 | Markham et al. | |
| 3,865,601 A | * 2/1975 | Serafin et al. | 106/659 |
| 3,913,847 A | 10/1975 | Glatt et al. | |
| 4,129,449 A | 12/1978 | Kojima | |
| 4,284,433 A | * 8/1981 | Aignesberger et al. | 106/725 |
| 4,482,379 A | * 11/1984 | Dibrell et al. | 106/609 |
| 5,085,708 A | 2/1992 | Moriya et al. | |
| 5,215,584 A | 6/1993 | Buxbaum et al. | |
| 5,728,209 A | 3/1998 | Bury et al. | |
| 5,766,323 A | 6/1998 | Butler et al. | |
| 6,238,475 B1 | 5/2001 | Gargulak et al. | |
| 6,648,962 B2 | 11/2003 | Berke et al. | |
| 6,740,632 B1 | 5/2004 | Jacob et al. | |

(Continued)

FOREIGN PATENT DOCUMENTS

CN  1772687 A  5/2006

(Continued)

OTHER PUBLICATIONS

Fan, Juan. Zhan, Huaiyu. "Optimization of Synthesis of Spherical Lignosulphonate Resin and Its Structure Characterization". Apr. 12, 2008 [Retrieved on May 31, 2011]. Chinese Journal of Chemical Engineering. 16 (3). pp. 407-410.*

(Continued)

*Primary Examiner* — Anthony J Green
*Assistant Examiner* — Karam Hijji
(74) *Attorney, Agent, or Firm* — IPLM Group, P.A.

(57) ABSTRACT

An agglomerated particulate lignosulfonate material may be made by introducing or forming lignosulfonate microparticles in a fluidized bed agglomerator, and introducing sufficient heated gas and lignosulfonate liquid in the agglomerator to convert the microparticles to lignosulfonate granules of enlarged size. The granules may have an average size of at least 0.1 mm, and may be used to make a dry-blended cement additive or oil well cement that may be dustless, easily poured and stored, and rapidly dissolved in water.

21 Claims, 3 Drawing Sheets

U.S. PATENT DOCUMENTS

| | | |
|---|---|---|
| 6,840,318 B2 | 1/2005 | Lee et al. |
| 2004/0009878 A1 | 1/2004 | Lynch et al. |
| 2007/0051280 A1* | 3/2007 | Fyten et al. .................. 106/735 |

FOREIGN PATENT DOCUMENTS

| | | |
|---|---|---|
| WO | WO 01/36344 A2 | 5/2001 |

OTHER PUBLICATIONS

"Lignosulphonate". GreatChem. Dec. 22, 2004 [Retrieved on Aug. 16, 2011]. Retrieved from [http://web.archive.org/web/20041211023157/http://www.greatchem.com/products/files/Lignosulphonate.htm].*

"Agglomeration/Granulation" product information sheet, Glatt GmbH, 2 pages, obtained from the Internet Archive at http://web.archive.org/web/20080612134837/http://www.glatt.com/e/01_technologien/01_03_02_01.htm (Jun. 9, 2008).

"Batch Fluid Bed Systems" product information sheet, Glatt GmbH, 1 page, obtained from the Internet Archive at http://web.archive.org/web/20080714155830/http://www.glatt.com/e/04_maschinen/04_02_01.htm (Jun. 9, 2008).

"Continuous Fluid Bed Systems" product information sheet, Glatt GmbH, 1 page, obtained from the Internet Archive at http://web.archive.org/web/20080612131548/http://www.glatt.com/e/04_maschinen/04_02_02.htm (Jun. 9, 2008).

"Fluid Bed Granulation" product information sheet, Glatt GmbH, 3 pages, obtained from the Internet Archive at http://web.archive.org/web/20080612141832/http://www.glatt.com/e/01_technologien/01_04_09.htm (Jun. 9, 2008).

"Fluidized Bed Precision Granulation™" product information sheet, Niro Inc., 1 page, obtained from the Internet Archive at http://web.archive.org/web/20080502121601/http ://www.niroinc.com/pharma_systems/fluidized_bed_granulation.asp (May 2, 2008).

Rantanen, Jukka et al., "Process Analysis of Fluidized Bed Granulation", AAPS PharmsciTech 2001, 2 (4), Article 21, 8 pages (Oct. 17, 2001).

Reknes, dr. ing. Kåre, "The secrets of lignosulfonate" (2000).

Fan, Juan, et al., "Optimization of Synthesis of Spherical Lignosulphonate Resin and Its Structure Characterization", Chinese Journal of Chemical Engineering, vol. 16, No. 3, pp. 407-410, (Jun. 2008).

* cited by examiner

AGGLOMERATED PARTICULATE LIGNOSULFONATE

FIELD

This invention relates to lignosulfonates.

BACKGROUND

Lignosulfonates are produced in large quantities as a byproduct of the pulp and paper industry, and have a number of valuable industrial uses. Lignosulfonates normally are used in their as-produced liquid form. Spray drying has been employed to convert the liquid to a finely-divided powder, and some end-users employ the resulting powder rather than the liquid. Lignosulfonate powder has also been mixed with lignosulfonate liquid to form a paste, then ground and sieved.

SUMMARY OF THE INVENTION

Liquid lignosulfonates include a substantial amount of water. The water content increases the product weight, volume and shipping cost and may be an undesirable component or diluent for some end uses. Spray-dried lignosulfonates typically include an appreciable portion of very small dusty particles. Grinding a dried lignosulfonate paste can consume appreciable time and energy, and can yield a product having a broad range of particle sizes including an appreciable portion of very small dusty particles.

The present invention provides in one aspect a method for making a particulate material, which method comprises:
a) introducing or forming lignosulfonate microparticles in a fluidized bed agglomerator;
b) introducing heated gas and lignosulfonate liquid in the agglomerator; and
c) enlarging the microparticles to form lignosulfonate granules.

The invention provides in another aspect a particulate material comprising non-comminuted lignosulfonate granules having an average size of at least 0.1 mm.

The invention provides in a further aspect a method for making a cement additive comprising dry-blending cement powder with non-comminuted lignosulfonate granules having an average size of at least 0.1 mm.

The invention provides in yet another aspect a cement additive comprising a mixture of cement powder and non-comminuted lignosulfonate granules having an average size of at least 0.1 mm.

The invention provides in yet another aspect a concrete mixture or oil well cement comprising a blend of cement, water, non-comminuted lignosulfonate granules having an average size of at least 0.1 mm and optional aggregate or proppant.

The disclosed lignosulfonate granules may provide one or more advantages such as low manufacturing cost, dustless or near-dustless dispensing characteristics, desirable handling and storage characteristics, low hydroscopicity and rapid aqueous dissolution.

DETAILED DESCRIPTION

Unless the context indicates otherwise the following terms shall have the following meaning and shall be applicable to the singular and plural:

The terms "a," "an," "the," "at least one," and "one or more" are used interchangeably. Thus a cement additive that contains "a" lignosulfonate material may include "one or more" lignosulfonate materials.

The term "average size" when used in respect to a collection of particles means the smallest sieve opening (expressed in mm) that will retain 50 wt. % of the particles in the collection using the measurement procedure described in Example 1.

The term "comminuted" when used in respect to a particulate material means that the particles have been fractured and reduced in size while dry by cutting, grinding, pulverizing, triturating or other particle fracturing process employing externally-applied forces significantly greater than the modest particle fracturing forces which may be experienced by particles travelling though a fluidized bed agglomerator.

The term "dry" when used in respect to a particulate material means that the particles do not include visible moisture and are free-flowing when poured.

The term "granules" means a collection of particles whose average size is at least 0.1 mm.

The term phrase "lignosulfonate" includes sulfonated lignin, sulfite lignin reaction products, and spent sulfite liquors that may be further reacted, purified, fractionated or the like to produce lignosulfonate-containing materials of interest.

The term "microparticles" means a collection of particles whose average size is less than 0.1 mm.

The term "Portland cement" includes pure Portland cement as well as blended cements containing Portland cement and a cement extender (e.g., blast furnace slag, or fly ash and other pozzolans).

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "size" when used in respect to a particle means the smallest sieve opening (expressed in mm) that will enable the particle to pass through the sieve using the measurement procedure described in Example 1.

The recitation of a numerical range using endpoints includes all numbers subsumed within that range (e.g., 1 to 5 includes 1, 1.5, 2, 2.75, 3, 3.80, 4, 5, etc.). The recitation of sets of upper and lower endpoints (e.g., at least 1, at least 2, at least 3, and less than 10, less than 5 and less than 4) includes all ranges that may be formed from such endpoints (e.g., 1 to 10, 1 to 5, 2 to 10, 2 to 5, etc.).

Figure 1:
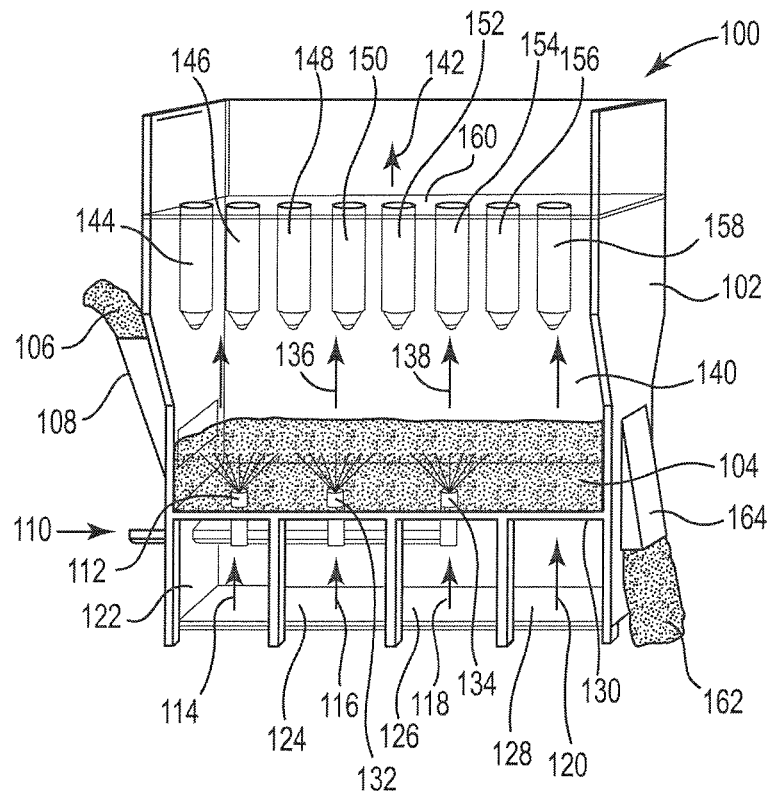
FIG. 1 is a schematic view of one embodiment of the disclosed manufacturing method.

FIG. 1 shows an exemplary schematic view of one embodiment of the disclosed manufacturing method. Continuous fluid bed agglomerator 100 includes a housing 102 containing fluidized bed 104. Lignosulfonate microparticles 106 may be introduced into fluidized bed 104 through inlet chute 108 (e.g., as a spray-dried lignosulfonate powder), may be formed in fluidized bed 104 by adding lignosulfonate liquid 110 to fluidized bed 104, e.g., through spray nozzle 112 or other suitable injector, or may be both introduced and formed in fluidized bed 104. Heated gas streams such as streams 114, 116, 118 and 120 (e.g., of heated air) may be introduced into fluidized bed 104 through supply chambers 122, 124, 126 and 128 and distribution plate 130. Additional lignosulfonate liquid 110 may be introduced into fluidized bed 104 via spray nozzles or other suitable injectors such as spray nozzles 132 and 134. Exposure to the heated gas and liquid lignosulfonate in the agglomerator will cause the lignosulfonate microparticles to agglomerate, grow or otherwise enlarge in size. Spent process gas such as gas streams 136, 138 may be removed from expansion zone 140 as filtered gas stream 142 by passage through filters such as filters 144, 146, 148, 150, 152, 154, 156 and 158 mounted in filter support plate 160. Lignosulfonate granules 162 may be removed from fluidized bed 104 through outlet chute 164. Microparticles and undersized agglomerates may be separated from the granules 162 (using for example, air classification) and returned to inlet chute 108 for further agglomeration or growth in fluidized bed 104, and the remaining lignosulfonate granules may be collected and used in various product applications.

Figure 2:
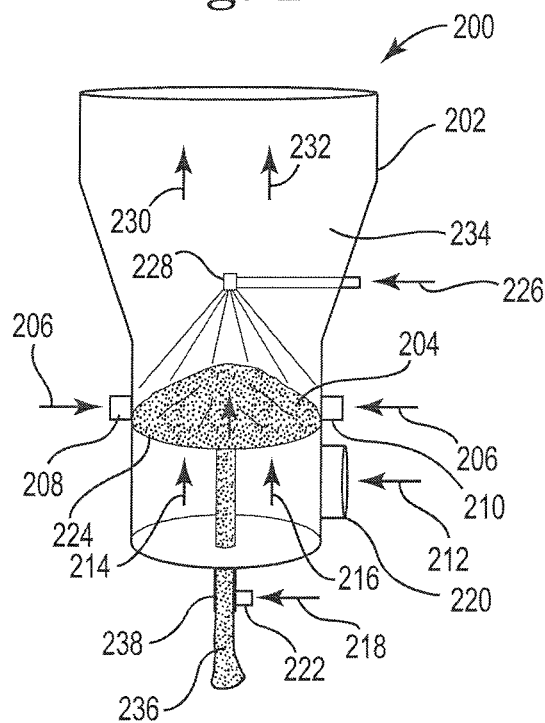
FIG. 2 is a schematic view of another embodiment of the disclosed manufacturing method.

FIG. 2 shows an exemplary schematic view of another embodiment of the disclosed manufacturing method. Batch fluid bed agglomerator 200 includes a housing 202 containing fluidized bed 204. Lignosulfonate microparticles 206 may be introduced into fluidized bed 204 through inlet pipes 208, 210. Heated gas streams such as streams 212, 214, 216 and 218 (e.g., of heated air) may be introduced into fluidized bed 204 through supply pipes 220, 222 and distribution plate 224. Additional lignosulfonate liquid 226 may be introduced into fluidized bed 204 via spray nozzles or other suitable injectors such as spray nozzle 228. Exposure to the heated gas and liquid lignosulfonate in the agglomerator will cause the lignosulfonate microparticles to agglomerate, grow or otherwise enlarge in size. Spent process gas such as gas streams 230, 232 may be removed from expansion zone 234. Lignosulfonate granules 236 may be removed from fluidized bed 204 through outlet pipe 238. Microparticles and undersized agglomerates may be separated from the granules 236 (using for example, air classification) and employed in or in place of the stream of lignosulfonate microparticles 206 when the next lignosulfonate agglomerate batch is prepared in apparatus 200. The remaining lignosulfonate granules may be collected and used in various product applications.

A variety of apparatus configurations and process parameters may be employed in an apparatus like that shown in FIG. 1 or FIG. 2. For example, a top spray lignosulfonate application may be employed in the FIG. 1 apparatus or a bottom spray lignosulfonate application may be employed in the FIG. 2 apparatus. A stream of lignosulfonate microparticles may be introduced at the start of operating a continuous agglomeration apparatus like that shown in FIG. 1 and then switched off, with the apparatus thereafter being operated using only lignosulfonate liquid introduction. Process parameters including the introduction rates for lignosulfonate microparticles, lignosulfonate liquid and heated gas; the overall or localized gas stream and bed temperatures; and other parameters which will be appreciated by persons having ordinary skill in the art of fluidized bed agglomeration may be adjusted or otherwise altered to control the rate and extent of microparticle agglomeration, growth or other enlargement. For example, the heated gas stream temperatures for continuous fluidized bed agglomerator operation may be about 170 to about 250° C. or about 170 to about 210° C., and the bed temperatures for continuous fluidized bed agglomerator operation may be about 60 to about 80° C. Bed retention times may for example be less than two hours, less than one hour, or about 15 to about 45 minutes. Desirably the bed temperatures, bed retention times and other conditions are such that the lignosulfonate granules undergo the desired degree of enlargement without becoming significantly oxidized or otherwise unduly degraded. The proportion of lignosulfonate microparticles used to make the desired lignosulfonate granules having an average size of at least 0.1 mm may for example represent 0 to about 40 or about 1 to about 35 wt. % of the collected granules. The proportion of lignosulfonate liquid used to make such granules may for example represent 100 to about 60 or about 99 to about 65 wt. % of the collected granules.

A variety of lignosulfonates may be employed to make the disclosed granules. Exemplary lignosulfonates may be obtained from a variety of sources including hardwoods, softwoods and recycling or effluent streams. The lignosulfonates may be utilized in crude or pure forms, e.g., in an "as is" or whole liquor condition, or in a purified lignosulfonate form from which or in which sugars and other saccharide constituents have been removed or destroyed, or from which or in which inorganic constituents have been partially or fully eliminated. The lignosulfonates may be utilized in salt forms including calcium lignosulfonates, sodium lignosulfonates, ammonium lignosulfonates, potassium lignosulfonates, magnesium lignosulfonates and mixtures or blends thereof. Lignosulfonates are available from a number of suppliers including Borregaard LignoTech, Georgia-Pacific Corporation, Lenzing AG and Tembec Inc.

A variety of fluid bed agglomerators may be employed to make the disclosed granules. Exemplary agglomerators include those shown or described in U.S. Pat. No. U.S. Pat. No. 3,913,847 (Glatt et al.) and U.S. Pat. No. 6,740,632 B1 (Jacob et al.). Other fluidized bed agglomerators are available from commercial suppliers including Glatt Air Techniques, Inc. and Niro, Inc. The disclosed granules may also be prepared by modifying a fluidized bed dryer to spray or otherwise add liquid lignosulfonate to heated lignosulfonate particles. For example, a lignosulfonate liquid spray could be added to the fluidized bed lignosulfonate powder reactor described in U.S. Pat. No. 3,746,740 (Markham et al.) and the operating temperatures and residence times described therein could be reduced to limit or prevent lignosulfonate oxidation. The operating temperatures, residence times and spray liquid addition rates could then be adjusted to bring about lignosulfonate microparticle enlargement and the formation of lignosulfonate granules.

The collected granules may consist of or consist essentially of lignosulfonate and may be coated or uncoated. The granules may for example have an average size of about 0.1 to about 10 mm, about 0.1 to about 5 mm, about 0.1 to about 2 mm, about 0.1 to about 1 mm, or about 0.1 to about 0.5 mm. The collected granules desirably contain little or no (e.g., less than 5 wt. %, less than 3 wt. % or less than 1 wt. %) particles having a size less than 0.1 mm. The granules also desirably have a higher density (for example, an uncompressed bulk density of about 550 to about 800 or about 560 to about 775 kg/m³) than spray-dried powder made using the same lignosulfonate starting liquid. When moistened or otherwise exposed to water or humid conditions, the granules desirably exhibit slower moisture absorption, remain free-flowing at higher moisture contents or are less prone to lump formation than spray-dried powders made using the same lignosulfonate starting liquid. When compared to such spray-dried powders, the granules desirably also have reduced tendency to leak from packaging (e.g., paper sacks), emit little dust or substantially no dust when poured, have a reduced tendency to remain behind in packaging when poured, or are easily removed from a spill site if accidentally spilled.

The disclosed lignosulfonate granules may be used in a variety of products and uses including cement additives, well cements (e.g., for gas, oil or water wells), pigment dispersants, battery separators, animal feeds and agricultural chemicals including the products or uses referred to in U.S. Pat. No. 2,582,459 (Salathiel), U.S. Pat. No. 4,284,433 (Aignesberger et al.), U.S. Pat. No. 5,215,584 (Buxbaum et al.), U.S. Pat. No. 5,728,209 (Bury et al.), U.S. Pat. No. 5,766,323 (Butler et al.), U.S. Pat. No. 6,238,847 B1 (Gargulak et al.), U.S. Pat. No. 6,648,962 B2 (Berke et al.) and U.S. Pat. No. 6,840,318 B2 (Lee et al.) and in Published PCT Application No. WO/01 36344 A2 (LignoTech USA, Inc.).

The disclosed granules have particular value in cement additives and well cements, and can be provided in a dry particulate form which may be much more conveniently shipped, stored or dispensed than corresponding additives made using lignosulfonate liquids or microparticle powders (e.g., spray-dried powders). The granules desirably provide comparable or improved fluidity, water content, set time retardation or air entrainment compared to cement additives made from spray-dried lignosulfonate powders made from the same lignosulfonate starting liquid. Cement additives and well cements containing the granules may include a variety of adjuvants, for example other cement plasticizers and superplasticizers such as melamine sulfonates (MSF), naphthalene sulfonates (PNS), polycarboxylates and polycarboxylic ether (PCE) polymers. The total cement plasticizer or superplasticizer amount, including any lignosulfonate which may be present, may for example be up to about 100% of the cement weight employed in the final concrete or well cement mixture, but desirably provide desired property improvements at much lower addition levels, e.g., at about 0.1 to about 1% solids based on the cement weight. De-foaming agents, for example tri-n-butylphosphate (TBP) and tri-iso-butylphosphate (TiBP) may be employed, e.g., in amounts of about 0.1-0.2 wt. % based on the cement weight. A variety of biocides or other preservatives may be employed, including compounds which give off formaldehyde (at, e.g., about 0.1-0.2 wt. % based on the cement weight), phenolic compounds (at, e.g., about 0.2-0.5 wt. % based on the cement weight) and isothiazolinone preparations (at, e.g., about 0.02-0.2 wt. % based on the cement weight). Desirably however the disclosed granules may be packaged without requiring biocides. Retarders, for example sucrose, gluconates, phosphates (e.g., tetrapotassium pyrophosphate, sodium tripolyphosphate and sodium hexametaphosphate) may be employed, e.g., in amounts of about 0.2-2 wt. % based on the cement weight. Accelerators, for example silicates and salts thereof including the sodium or potassium salts, aluminates, carbonates, formiates, amorphous aluminum hydroxides and aluminum sulfate may be employed, e.g., in amounts of about 1-3 wt. % based on the cement weight. Air-entraining agents, for example natural resins (e.g., resin soap, tall resins, colophony and other gum resins, and root resins) and synthetic non-ionic or ionic surfactants (e.g., alkylpolyglycol ethers, alkylsulfates and alkylsulfonates) may be employed, e.g., in amounts of about 0.5-1 wt. % based on the cement weight. Stabilizers and sedimentation reducers may also be employed, for example starch derivatives and other polysaccharides (e.g., cellulose ether, starch ether, xanthan gum and whelan gum), synthetic high molecular weight polymers (e.g., polyethylene oxides and polyacrylates) and fine grained inorganic substances with large specific surfaces (e.g., silica powder, silica suspensions and silica sols), e.g., in amounts up to about 1 wt. % based on the cement weight. The dry nature of the disclosed granules permits them to be used to make dry cement additives which may be combined with cement, aggregate and water to prepare concrete mixtures at reduced dilution compared to concrete mixtures made using liquid lignosulfonate additives. The disclosed granules also may be combined with cement, proppants and water to make oil well cements with desirable fluidity and curing characteristics.

The invention is further described in the following Examples, in which all parts and percentages are by weight unless otherwise indicated.

EXAMPLE 1

Agglomerated Granules

Figure 3:
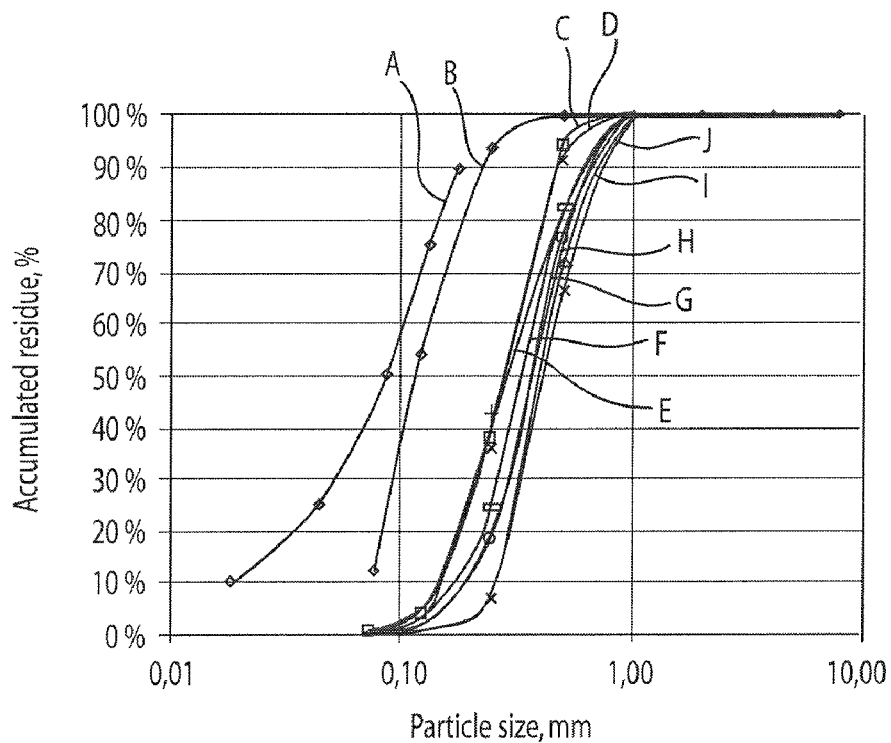
FIG. 3 is a graph showing particle size distribution data for a spray-dried lignosulfonate powder and nine non-comminuted lignosulfonate granule samples.

A continuous feed GLATT™ fluidized bed agglomerator equipped with sprayheads for bottom spray liquid introduction was employed to make a series of lignosulfonate granules. The agglomerator was initially operated using spray-dried lignosulfonate microparticles (made using BORRESPERSE™ CA-SA lignosulfonate liquid from Borregaard LignoTech) as a seed feed, additional BORRESPERSE CA-SA lignosulfonate liquid in the bottom spray units as an agglomerating liquid feed, and process air heated to about 190° C. The seed and liquid feed streams were initially introduced in a 30:70 weight ratio. The agglomerator was operated at full capacity using a bed residence time of about 15-20 minutes, and at 50% capacity using a bed residence time of about 25-30 minutes. The microparticle feed could be switched off shortly after the start of each run and similar granules could be obtained by increasing the bed residence time to about 25-30 minutes for operation at full capacity and about 40-45 minutes for operation at 50% capacity. A series of 9 granule samples was prepared. Particle size distribution curves for these samples are identified in FIG. 3 as Curve B through Curve J, along with a comparison particle size distribution curve (Curve A) for the spray-dried lignosulfonate powder. FIG. 3 employs a logarithmic horizontal particle size axis, and the differences in sample particle sizes thus appear at first glance to be somewhat compressed. Due to the significantly smaller average particle size of the Curve A spray-dried comparison sample, laser diffraction was employed to measure its particle size distribution. Sieves were used to measure particle size distributions for the Curve B through Curve J granule samples. The sieve measurement procedure employed approximately 200 g portions of the tested granules. The granules were poured over a stack of measurement sieves in graduated sizes and shaken for 5 minutes using a Model 1132-2-A sieve vibrator (from Pascall Engineering), followed by weighing to determine the granule weight in each sieve.

The results in FIG. 3 show that the Curve A spray-dried powder had an average particle size of about 0.09 mm and a relatively broad particle size distribution whereas the granules produced using the fluidized bed agglomerator had average particle sizes of about 0.11 to about 0.6 mm and much narrower particle size distributions. For the Curve A spray-dried powder, more than half the powder by weight had a particle size less than 0.1 mm. For the granule sample identified as Curve B, less than about 35 wt. % of the granules had a particle size less than 0.1 mm. For the Curve C through Curve J granule samples, less than about 3 wt. % of the granules had a particle size less than 0.1 mm.

Dry flow properties were evaluated by individually placing 200 g samples of each granule and of the Curve A powder in a 360 mm tall by 70 mm diameter vertical plastic cylinder whose lower end had been fitted with a plastic funnel. The funnel had a 22 mm diameter outlet placed 150 mm above a Model PG5002-S laboratory balance (from Mettler-Toledo). Flow curves were prepared by measuring the total sample weight under the funnel at one second intervals. Depending on the granule sample average particle size, the granules exited the funnel within 9-12 seconds after the start of measurement, with larger average particle size samples exiting more quickly than smaller average particle size samples. The Curve A powder sample remained in the cylinder and funnel and did not drop onto the balance.

Aqueous dissolving speed was evaluated by individually placing sufficient amounts of each granule sample in deionized water to provide 45% or 50% dry matter in a 2 Kg solution. The water was stirred in a 2 L beaker at approximately 550 rpm using a model RW 20 stirring motor (from Kanke & Kunkel) equipped with a two-bladed metal propeller.

The sample was dropped onto the water all at once and a stopwatch was employed to measure the time required to obtain a uniformly dissolved mixture. The 45% dry matter solutions dissolved in 10 to 30 minutes, and the 50% dry matter solutions dissolved in 30 to 45 minutes. In a comparison run, a 45% dry matter solution made using the Curve A spray-dried powder required 60 minutes to dissolve, and a 50% dry matter solution required 75 minutes to dissolve.

EXAMPLE 2

Cement Additives

Figure 4:
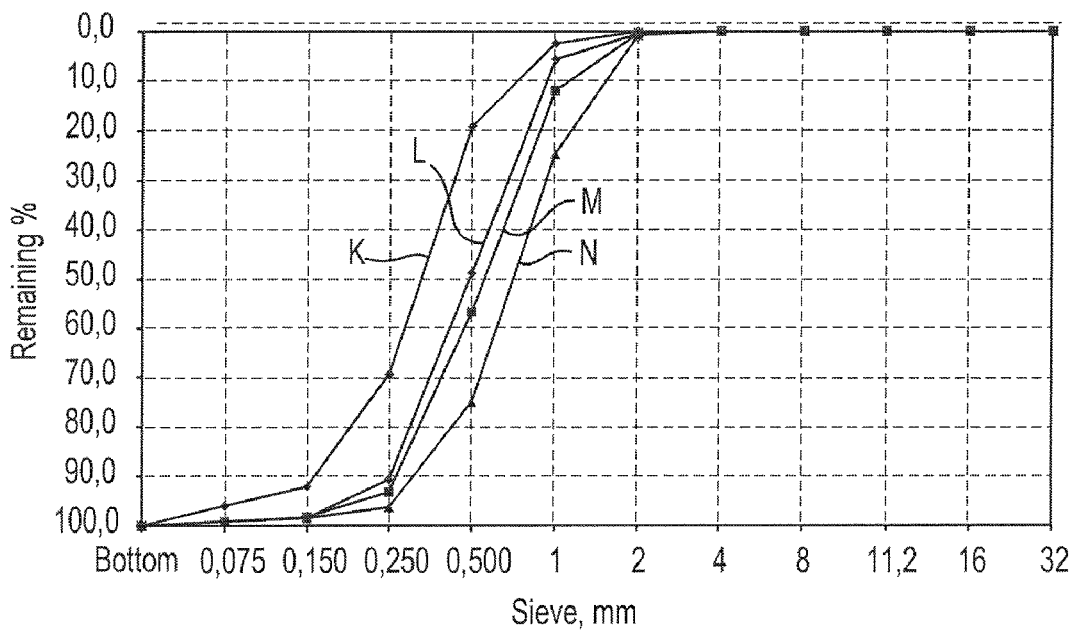
FIG. 4 is a graph showing particle size distribution data for a naphthalenesulphonic acid condensation product cement additive and for three non-comminuted calcium lignosulfonate granule samples.

Using the method of Example 1, lignosulfonate granules were prepared using BORRESPERSE™ CA calcium lignosulfonate from Borregaard LignoTech. FIG. 4 shows a particle size distribution curve (Curve K) for a comparison cement additive sold as TAMOL™ NH 7519 naphthalenesulphonic acid condensation product (from BASF) and three particle size distribution curves for fine (Curve L), medium (Curve M) and coarse (Curve N) granules made using BORRESPERSE CA calcium lignosulfonate. The horizontal axis in FIG. 4 shows the sieve opening in mm and is non-linear.

Figure 5:
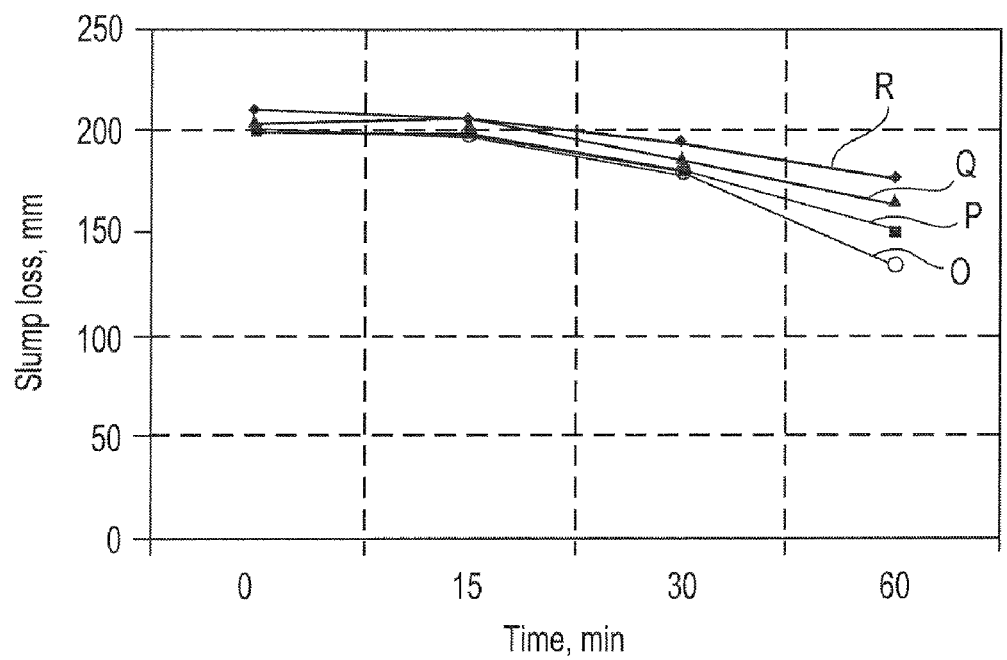
FIG. 5 is a graph comparing concrete workability as a function of time for the FIG. 4 calcium lignosulfonate granule samples and for a spray-dried lignosulfonate powder made from the same calcium lignosulfonate.

Concrete mixtures were prepared in 60 L batches using EN 197-1 CEM 142.5 R Portland cement (Standard Portland 30 from Embra, 350 kg/m$^3$ density), graded aggregate sized in accordance with DIN EN 480-1 (0-8 mm 55 wt. %; 8-12 mm 22.5 wt. %; 12-16 mm 22.5 wt. %; 16 mm $D_{max}$) and a 0.5 water:cement weight ratio, together with the FIG. 4 samples as cement additives at 0.28 to 0.3% solids by weight of cement (sbwc). A concrete mixture was also prepared using lignosulfonate powder made from spray-dried BORRESPERSE CA calcium lignosulfonate. The concrete mixtures were evaluated for air content, density, set time, initial slump and slump loss. The dry individual cement additives were also placed in a 1 L calibrated container and evaluated to determine their uncompacted bulk densities. The uncompacted samples were then vibrated for 30 seconds using a vibration table. The calibrated container was refilled and again vibrated for another 30 seconds and a density for the resulting compacted additive was recorded. The individual cement additives were also evaluated to determine wt. % dry matter. The results of the concrete mixture and additive evaluations are shown below in Table A. Slump loss results are also shown in FIG. 5 for the spray-dried lignosulfonate powder (Curve O) and the fine (Curve P), medium (Curve Q) and coarse (Curve R) lignosulfonate granules also shown in FIG. 4. The results in FIG. 5 and Table A show that compared to the spray-dried lignosulfonate, the granulated lignosulfonates had increased air content, similar initial slump, improved slump retention and similar set time. Compared to the naphthalenesulphonic acid condensation product powder, the granulated lignosulfonates had increased air content, greater initial slump and longer set time. Both the spray-dried lignosulfonate and the naphthalenesulphonic acid condensation product powder formed considerable dust when poured, whereas no dusting was observed when pouring the granulated lignosulfonates.

TABLE A

Concrete and Additive Properties

|  | TAMOL Powder (Curve K) | Spray-dried BORRESPERSE CA Powder | Fine BORRESPERSE CA Granules (Curves L and P) | Medium BORRESPERSE CA Granules (Curves M and Q) | Coarse BORRESPERSE CA Granules (Curves N and R) |
|---|---|---|---|---|---|
| Dosage (% sbwc) | 0.30 | 0.30 | 0.29 | 0.30 | 0.28 |
| Air Content (vol. %) | 2.2 | 3.7 | 6.7 | 6.0 | 6.8 |
| Density (kg/m$^3$) | 2393 | 2341 | 2282 | 2292 | 2271 |
| Set Time (Hours) | 4.0 | 10.5 | 9.8 | 9.8 | 10.1 |
| Slump (mm) at Time: |  |  |  |  |  |
| 0 Min | 73 | 200 | 205 | 202 | 208 |
| 15 Min |  | 200 | 198 | 207 | 204 |
| 30 Min |  | 182 | 180 | 187 | 195 |
| 60 Min |  | 135 | 150 | 165 | 178 |
| 90 Min |  |  |  |  |  |
| Bulk Density (kg/m$^3$): |  |  |  |  |  |
| Uncompacted | 435 | 536 | 565 | 563 | 654 |
| Vibrated 1 Min | 520 | 649 | 657 | 659 | 765 |
| Dry Matter (%) | 88.1 | 92.8 | 93.9 | 92.3 | 92.2 |

EXAMPLE 3

Additional Cement Additives

Figure 6:
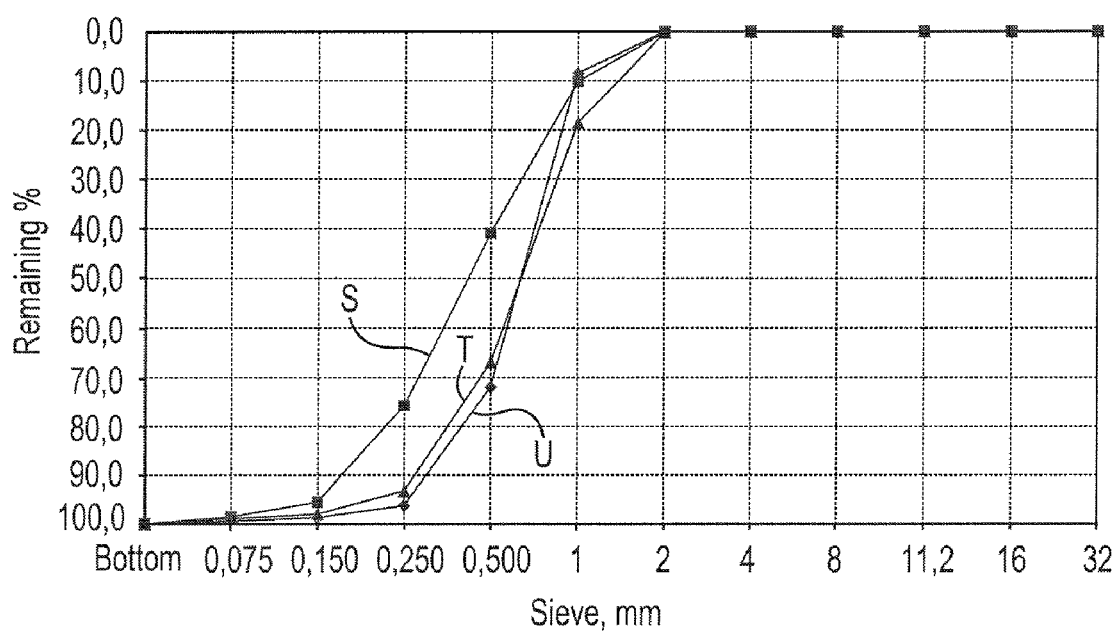
FIG. 6 is a graph showing particle size distribution data for three non-comminuted calcium lignosulfonate granule samples.

Using the method of Example 1, lignosulfonate granules were prepared using BORRESPERSE™ NA sodium lignosulfonate from Borregaard LignoTech. FIG. 6 shows particle size distribution curves for the resulting fine (Curve S), medium (Curve T) and coarse (Curve U) granules. The horizontal axis in FIG. 6 shows the sieve opening in mm and is non-linear. Using the method of Example 2, the granules and a lignosulfonate powder made from spray-dried BORRESPERSE NA sodium lignosulfonate were used as cement additives at 0.30% sbwc, and evaluated for air content, density, set time, initial slump and slump loss. The dry additives were also evaluated for uncompacted and compacted bulk densities and wt. % dry matter. The results are shown below in Table B. Compared to the spray-dried lignosulfonate, the granulated lignosulfonates had slightly increased air content, lower initial slump, similar slump retention and similar set time. The spray-dried lignosulfonate powder formed considerable dust when poured, whereas no dusting was observed when pouring the granulated lignosulfonates.

TABLE B

Concrete and Additive Properties

|  | Spray-dried BORRESPERSE CA Powder | Fine BORRESPERSE NA Granules (Curve S) | Medium BORRESPERSE NA Granules (Curve T) | Coarse BORRESPERSE NA Granules (Curve U) |
| --- | --- | --- | --- | --- |
| Dosage (% sbwc) | 0.30 | 0.30 | 0.30 | 0.30 |
| Air Content (vol. %) | 3.6 | 4.4 | 4.3 | 4.4 |
| Density (kg/m$^3$) | 2349 | 2331 | 2329 | 2329 |
| Set Time (Hours) | 6.6 | 6.6 | 7.0 | 6.5 |
| Slump (mm) at Time: | | | | |
| 0 Min | 200 | 179 | 184 | 177 |
| 15 Min | 178 | 157 | 143 | 153 |
| 30 Min | 144 | 90 | 107 | 90 |
| 60 Min | 83 | 78 | 87 | 64 |
| 90 Min | | | | |
| Bulk Density (kg/m$^3$): | | | | |
| Uncompacted | 577 | 560 | 580 | 562 |
| Vibrated 1 Min | 689 | 660 | 685 | 648 |
| Dry Matter (%) | 94.9 | 92.0 | 92.0 | 91.7 |

Having thus described the preferred embodiments of the present invention, those of skill in the art will readily appreciate that the teachings found herein may be applied to yet other embodiments within the scope of the claims hereto attached. The complete disclosures of all patents, patent documents, and publications are incorporated herein by reference as if individually incorporated.

We claim:

1. A cement additive comprising a mixture of cement powder and non-comminuted lignosulfonate granules having an average size of at least 0.1 mm.

2. An additive according to claim 1 wherein the cement powder comprises Portland cement.

3. An additive according to claim 1 wherein the granules have an average size of about 0.1 to about 10 mm.

4. An additive according to claim 1 wherein the granules consist essentially of calcium, sodium or magnesium lignosulfonate.

5. An additive according to claim 1 wherein the additive further comprises melamine sulfonate, naphthalene sulfonate, polycarboxylate or polycarboxylic ether.

6. A concrete mixture or oil well cement comprising a blend of cement, water, non-comminuted lignosulfonate granules having an average size of at least 0.1 mm and optional aggregate or proppant.

7. A concrete mixture or oil well cement according to claim 6 wherein the granules have an average size of about 0.1 to about 10 mm.

8. A concrete mixture or oil well cement according to claim 6 wherein the granules have an average size of about 0.1 to about 5 mm.

9. A concrete mixture or oil well cement according to claim 6 wherein the granules contain less than 5 wt. % particles having a size less than 0.1 mm.

10. A concrete mixture or oil well cement according to claim 6 wherein the granules have an uncompressed bulk density of about 550 to about 800 kg/m$^3$.

11. A concrete mixture or oil well cement according to claim 6, wherein the granules are free-flowing when poured.

12. A concrete mixture or oil well cement according to claim 6, wherein the granules emit substantially no dust when poured.

13. A concrete mixture or oil well cement according to claim 6, wherein the granules consist essentially of calcium, sodium or magnesium lignosulfonate.

14. A concrete mixture or oil well cement according to claim 6, wherein the granules are present at about 0.1 to about 1% solids by weight of cement.

15. A concrete mixture or oil well cement according to claim 6, comprising aggregate or proppant.

16. An additive according to claim 1 wherein the granules have an average size of about 0.1 to about 5 mm.

17. An additive according to claim 1 wherein the granules contain less than 5 wt. % particles having a size less than 0.1 mm.

18. An additive according to claim 1 wherein the granules have an uncompressed bulk density of about 550 to about 800 kg/m³.

19. An additive according to claim 1 wherein the granules are free-flowing when poured.

20. An additive according to claim 1 wherein the granules emit substantially no dust when poured.

21. An additive according to claim 1 wherein the granules are present at about 0.1 to about 1% solids by weight of cement.

\* \* \* \* \*